US012716563B2

(12) United States Patent
Lee et al.

(10) Patent No.: US 12,716,563 B2
(45) Date of Patent: Aug. 25, 2026

(54) LAMP FOR VEHICLE

(71) Applicant: HYUNDAI MOBIS CO., LTD., Seoul (KR)

(72) Inventors: Hyun Soo Lee, Yongin-si (KR); Na Ram Jun, Yongin-si (KR); Tae Yang Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/295,847

(22) Filed: Aug. 11, 2025

(65) Prior Publication Data

US 2026/0153206 A1 Jun. 4, 2026

(30) Foreign Application Priority Data

Dec. 4, 2024 (KR) ........................ 10-2024-0178618

(51) Int. Cl.

| | |
|---|---|
| ***F21S 41/24*** | (2018.01) |
| ***F21S 41/145*** | (2018.01) |
| ***F21S 43/14*** | (2018.01) |
| ***F21S 43/241*** | (2018.01) |
| ***F21S 43/249*** | (2018.01) |
| ***F21W 102/13*** | (2018.01) |
| ***F21W 103/55*** | (2018.01) |
| ***F21Y 115/10*** | (2016.01) |

(52) U.S. Cl.

CPC ............. *F21S 41/24* (2018.01); *F21S 41/145* (2018.01); *F21S 43/14* (2018.01); *F21S 43/241* (2018.01); *F21S 43/2492* (2024.05); *F21W 2102/13* (2018.01); *F21W 2103/55* (2018.01); *F21Y 2115/10* (2016.08)

(58) Field of Classification Search

CPC .......... F21S 41/24; F21S 41/145; F21S 43/14; F21S 43/241; F21S 43/2492

See application file for complete search history.

(56) References Cited

U.S. PATENT DOCUMENTS

| | | | | |
|---|---|---|---|---|
| 7,131,760 | B2 * | 11/2006 | Mayer ................... | F21V 19/001 362/555 |
| 7,207,705 | B2 * | 4/2007 | Ishida ................... | F21S 41/323 362/346 |
| 10,082,272 | B2 * | 9/2018 | Gromfeld ............. | F21S 41/265 |
| 10,808,902 | B1 * | 10/2020 | Lim ........................ | F21S 41/33 |
| 11,761,600 | B2 * | 9/2023 | Wu ........................... | F21V 7/06 362/509 |

(Continued)

*Primary Examiner* — Matthew J. Peerce

(74) *Attorney, Agent, or Firm* — NSIP Law

(57) ABSTRACT

A lamp for a vehicle includes a light guide part at one side of a light source to receive light emitted from the light source. The light guide part includes a front surface portion to define a front region, a rear surface portion to define a rear region, an upper surface portion to connect the front surface portion to the rear surface portion to define an upper region of the light guide part, and a lower surface portion to connect the front surface portion to the rear surface portion to define a lower region of the light guide part. The lower surface portion includes a downward protruding region, the downward protruding region being at least partially provided rearward of the light source, and light source emits light rearward toward the downward protruding region, and at least a part of the downward protruding region has a light reflection surface.

20 Claims, 3 Drawing Sheets

(56) References Cited

U.S. PATENT DOCUMENTS

| | | | | |
|---|---|---|---|---|
| 11,781,733 | B2 * | 10/2023 | Qiu | F21S 41/153<br>362/235 |
| 12,123,565 | B2 * | 10/2024 | Thombre | F21S 43/243 |
| 2003/0063476 | A1 * | 4/2003 | English | F21S 45/48<br>362/547 |

* cited by examiner

LAMP FOR VEHICLE

CROSS-REFERENCE TO RELATED APPLICATION

This application claims priority to and the benefit of Korean Patent Application No. 10-2024-0178618 filed in the Korean Intellectual Property Office on Dec. 4, 2024, the entire contents of which are incorporated herein by reference.

TECHNICAL FIELD

The present disclosure relates to a lamp for a vehicle, and more particularly, to a lamp for a vehicle, the lamp being capable of forming a plurality of light distribution patterns.

BACKGROUND

Various types of vehicle lamps, which are classified depending on functions thereof, are mounted in a vehicle. For example, low beam lamps, high beam lamps, daytime running light (DRL) lamps, and the like are mounted on a front side of the vehicle.

In the related art, because various types of lamps are mounted together in vehicles, light-emitting surfaces formed by the lamps are different from one another, which causes a problem in that designs of the vehicles cannot meet consumer demands when the lamps are turned on. Furthermore, because various types of lamps are mounted in vehicles, which causes a problem in that spaces occupied by the lamps in the vehicles are excessively large.

SUMMARY

The present disclosure has been made in an effort to provide a lamp module for a vehicle, the lamp module having a structure in which one lamp for a vehicle may perform two or more functions, such that one light-emitting surface may be shared even in case that the lamps with different functions are turned on, thereby promoting differentiation in terms of designs of vehicles.

In order to achieve the above-mentioned object, one aspect of the present disclosure provides a lamp for a vehicle, the lamp including: a light source; and a light guide part disposed at one side of the light source and configured to receive light emitted from the light source, in which the light guide part includes: a front surface portion configured to define a front region of the light guide part; a rear surface portion configured to define a rear region of the light guide part; an upper surface portion configured to connect the front surface portion to the rear surface portion and configured to define an upper region of the light guide part; and a lower surface portion configured to connect the front surface portion to the rear surface portion and configured to define a lower region of the light guide part, in which the light source includes: a first light source disposed rearward of the light guide part and disposed to face the rear surface portion; and a second light source disposed below the first light source, in which the lower surface portion includes a downward protruding region including a portion protruding downward, the downward protruding region being at least partially provided rearward of the second light source, in which the second light source is configured to emit light rearward toward the downward protruding region, and in which at least a part of the downward protruding region, which faces the second light source, has a light reflection surface.

The light guide part may be formed integrally.

The light reflection surface may be disposed over an entire front surface of the downward protruding region.

The light reflection surface may have a shape recessed rearward.

A cross-section made by cutting the light reflection surface in a direction perpendicular to a leftward/rightward direction W may have a shape recessed rearward.

A horizontal cross-section of the light reflection surface may have a shape recessed rearward.

A cross-section made by cutting the light reflection surface in a direction perpendicular to a leftward/rightward direction W may have a shape of a part of an ellipse recessed rearward.

A light-emitting region of the second light source may be provided at a position corresponding to one of two focal points of the ellipse.

The other of two focal points of the ellipse may be disposed at a position corresponding to a focal point of the front surface portion based on an upward/downward direction H.

The second light source may be disposed such that an optical axis of the second light source has predetermined angles with respect to a forward/rearward direction and an upward/downward direction H.

A height of a light-emitting region of the second light source in an upward/downward direction H may correspond to a height of the light reflection surface in the upward/downward direction H.

The lower surface portion may include: a light guide protruding region spaced apart forward from the downward protruding region and protruding downward; and a lower reflection region provided between the downward protruding region and the light guide protruding region.

A rear surface of the light guide protruding region may include a flat surface region.

A rear surface of the light guide protruding region may include an inclined surface shape positioned forward in a downward direction.

The lower reflection region may have a stepped section disposed at a boundary between one side surface based on a leftward/rightward direction W and the other side surface based on the leftward/rightward direction W.

The light guide part may include a light collection region disposed between the upper surface portion and the lower surface portion and disposed to face the first light source.

The light collection region and the downward protruding region may overlap each other in a forward/rearward direction.

The light collection region may include a portion having a collimator shape.

Light, which is emitted from the first light source and totally reflected by an inner surface of an upper portion of the light collection region, may reach the lower reflection region.

The other of the two focal points of the ellipse may be disposed at a position corresponding to the lower reflection region.

According to the present disclosure, one lamp for a vehicle may perform two or more functions, such that one light-emitting surface may be shared even in case that the lamps with different functions are turned on, thereby promoting differentiation in terms of designs of the vehicles.

DETAILED DESCRIPTION

Hereinafter, a lamp for a vehicle according to the present disclosure will be described with reference to the drawings.

Lamp for Vehicle

Figure 1:
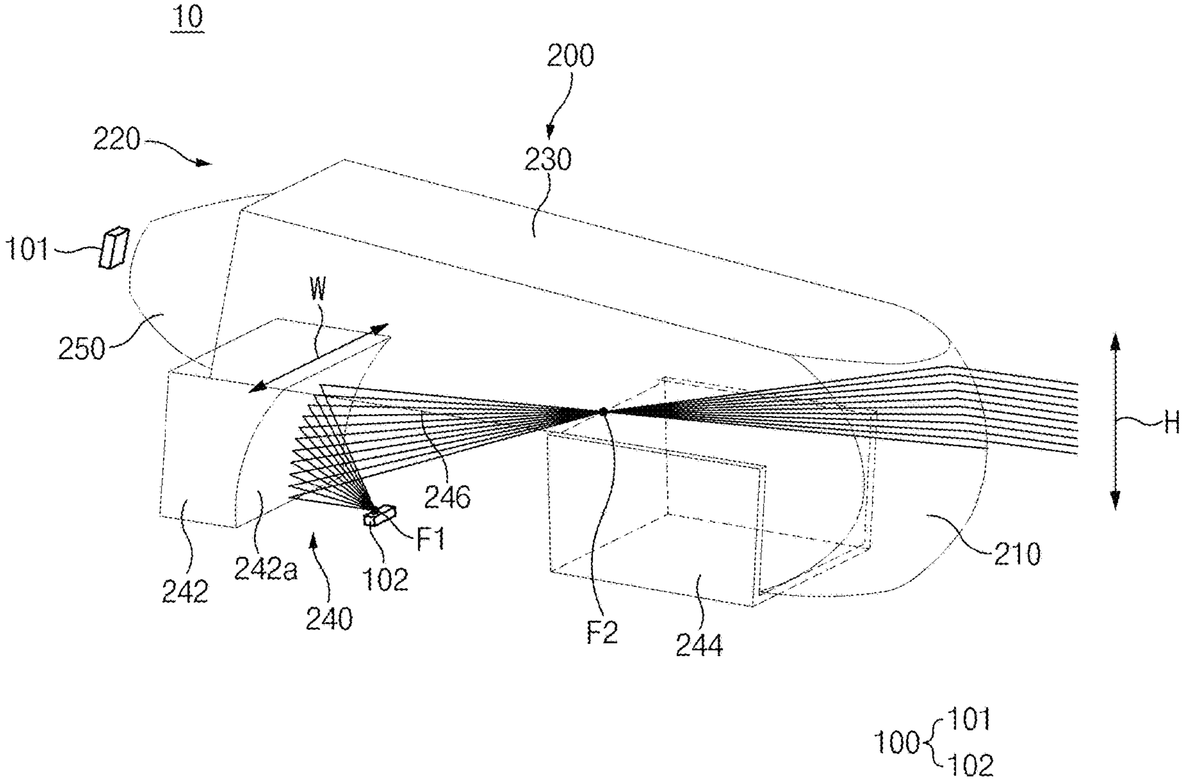
FIG. 1 is a perspective view of a lamp for a vehicle according to the present disclosure.
Figure 2:
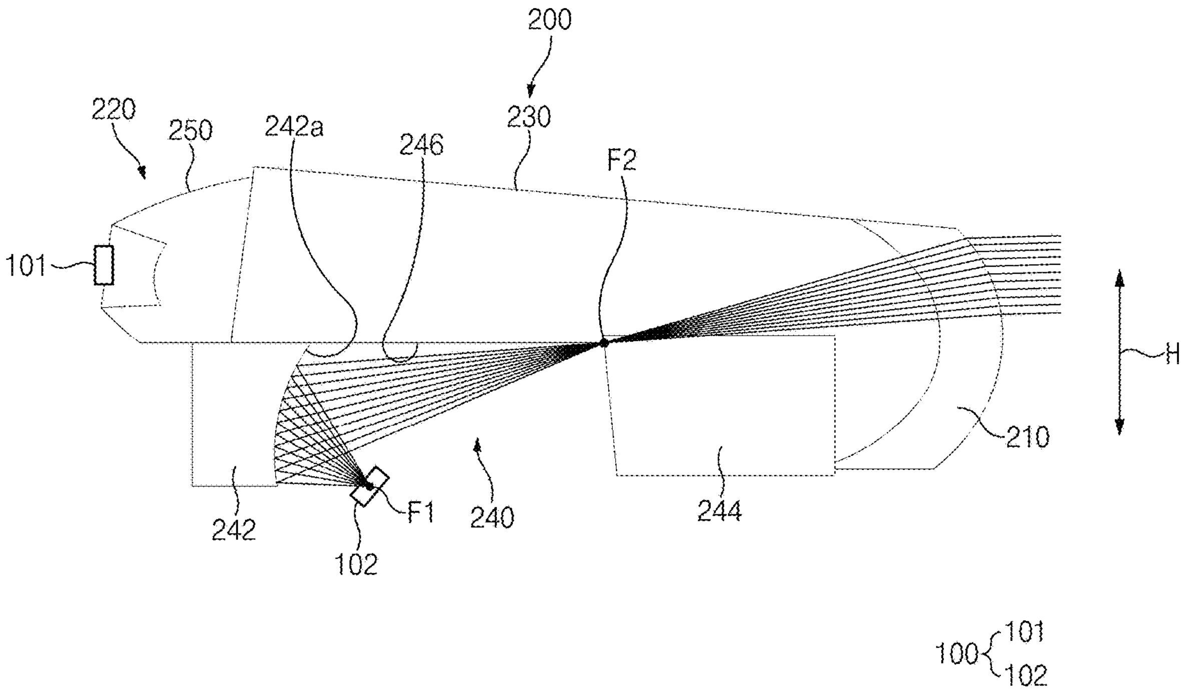
FIG. 2 is a side view of the lamp for a vehicle according to the present disclosure.
Figure 3:
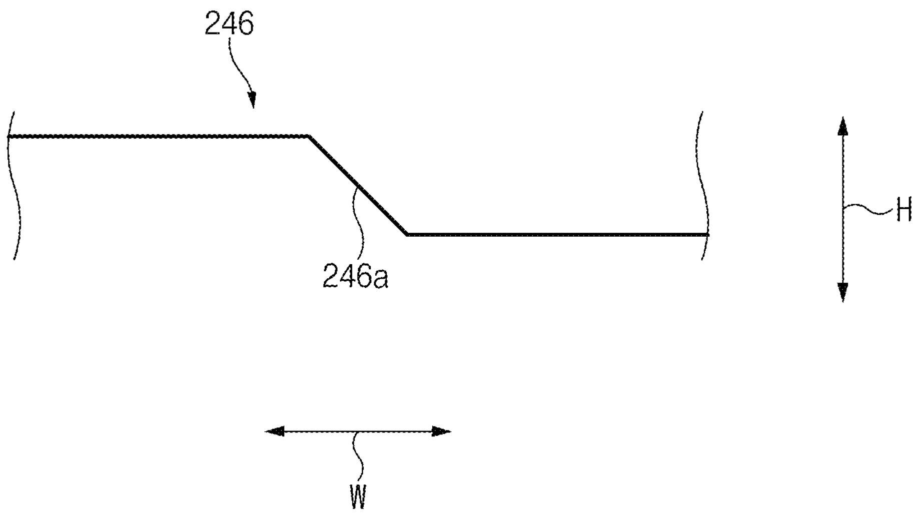
FIG. 3 is a view illustrating a cross-sectional structure of a stepped section formed on a light guide part of the lamp for a vehicle according to the present disclosure.

FIG. 1 is a perspective view of a lamp for a vehicle according to the present disclosure, and FIG. 2 is a side view of the lamp for a vehicle according to the present disclosure. FIG. 3 is a view illustrating a cross-sectional structure of a stepped section formed on a light guide part of the lamp for a vehicle according to the present disclosure.

A lamp for a vehicle (hereinafter, referred to as a 'lamp') according to the present disclosure may be a lamp module capable of forming two or more types of light distribution patterns. That is, the lamp according to the present disclosure may individually form a first light distribution pattern and a second light distribution pattern different from the first light distribution pattern. For example, the first light distribution pattern may be a low beam pattern, and the second light distribution pattern may be a daytime running light (DRL) pattern. However, the types of the first and second light distribution patterns are not limited to the above-mentioned contents. Various types of beam patterns may be applied.

With reference to FIGS. 1 to 3, a lamp 10 according to the present disclosure may include a light source 100, and a light guide part 200 provided at one side of the light source 100 and configured to receive light emitted from the light source 100. The entire light guide part 200 according to the present disclosure may be a lens formed integrally. Therefore, according to the present disclosure, first and second light distribution patterns may be formed by one integrated lens, i.e., the light guide part 200. Even in case that the light distribution patterns with different functions are formed, one light-emitting surface may be shared by means of one light guide part, thereby promoting differentiation in terms of designs of the vehicles.

Meanwhile, a surface of the light guide part 200 may be divided into a plurality of regions depending on positions. More specifically, the light guide part 200 may include a front surface portion 210 configured to define a front region of the light guide part 200, a rear surface portion 220 configured to define a rear region of the light guide part 200, an upper surface portion 230 configured to connect the front surface portion 210 and the rear surface portion 220 and configured to define an upper region of the light guide part 200, and a lower surface portion 240 configured to connect the front surface portion 210 and the rear surface portion 220 and configured to define a lower region of the light guide part 200.

In addition, the light source 100 may include a first light source 101 disposed rearward of the light guide part 200 and provided to face the rear surface portion 220, and a second light source 102 provided below the first light source 101. As described below, the first light source 101 may emit light forward, whereas the second light source 102 may emit light rearward. For example, the first light source 101 and the second light source 102 may each be an LED. According to the present disclosure, light emitted from the first light source 101 may form the first light distribution pattern (e.g., a low beam distribution pattern), and light emitted from the second light source 102 may form the second light distribution pattern (e.g., a DRL distribution pattern).

That is, according to the present disclosure, at least a part of the light emitted from the first light source 101 may pass through the rear surface portion 220 of the light guide part 200 and then exit to the outside, thereby forming the first light distribution pattern. At least a part of the light emitted from the second light source 102 may pass through the upper surface portion 230 of the light guide part 200 and then exit to the outside, thereby forming the second light distribution pattern. More particularly, the second light distribution pattern may be formed above the first light distribution pattern. Hereinafter, the features of the light guide part 200 for exhibiting the above-mentioned functions will be described in detail.

As illustrated in FIGS. 1 and 2, the lower surface portion 240 may include a downward protruding region 242 including a portion protruding downward, the downward protruding region 242 being at least partially provided rearward of the second light source 102. The second light source 102 may emit light rearward toward the downward protruding region 242, and the light emitted from the second light source 102 may reach one surface of the downward protruding region 242. More specifically, according to the present disclosure, at least a part of a region of the downward protruding region 242, which faces the second light source 102, may have a light reflection surface 242*a*. Therefore, the light emitted from the second light source 102 may be reflected by the light reflection surface 242*a* and then move forward. The light reflection surface 242*a* may be a front surface of the downward protruding region 242. More particularly, the light reflection surface 242*a* may be formed over the entire front surface of the downward protruding region 242. For example, the light reflection surface 242*a* may be formed by attaching or applying a light reflection layer onto the front surface of the downward protruding region 242.

According to the present disclosure, the light reflection surface 242*a* may have a shape recessed rearward. This may be to collect the light after the light emitted from the second light source 102 is reflected by the light reflection surface 242*a*.

For example, a cross-section made by cutting the light reflection surface 242*a* in a direction perpendicular to a leftward/rightward direction W may have a shape recessed rearward, and a horizontal cross-section of the light reflection surface 242*a* may also have a shape recessed rearward.

More particularly, the cross-section made by cutting the light reflection surface 242*a* in the direction perpendicular to the leftward/rightward direction W may have a shape of a part of an ellipse recessed rearward.

The ellipse has two focal points F1 and F2 by definition. According to the present disclosure, a light-emitting region of the second light source 102 may be provided at a position corresponding one F1 of the two focal points F1 and F2 of the ellipse. In this case, it is possible to maximize the light concentration efficiency of the light emitted from the second light source 102. Meanwhile, the other F2 of the two focal points F1 and F2 of the ellipse may be positioned at a position corresponding to a focal point of the front surface portion 210 based on an upward/downward direction H.

Meanwhile, according to the present disclosure, the second light source 102 may emit light rearward in a direction inclined upward. That is, the second light source 102 may be disposed such that an optical axis of the second light source 102 has predetermined angles with respect to a forward/rearward direction and the upward/downward direction H. Meanwhile, for example, as illustrated in FIG. 2, a height of the light-emitting region of the second light source 102 in the upward/downward direction H may correspond to a height of the light reflection surface 242*a* in the upward/downward direction H. More specifically, the height of the light-emitting region of the second light source 102 in the upward/downward direction H may be equal to the height of the light reflection surface 242*a* in the upward/downward direction H.

With continued reference to FIGS. 1 and 2, the lower surface portion 240 may further include a light guide protruding region 244 spaced apart forward from the downward protruding region 242 and protruding downward, and a lower reflection region 246 provided between the downward protruding region 242 and the light guide protruding region 244.

According to the present disclosure, at least a part of the light, which is emitted from the second light source 102, is reflected by the light reflection surface 242*a* of the downward protruding region 242, and propagates forward, may reach the lower reflection region 246. More particularly, the light, which is emitted from the second light source 102 and reflected by the light reflection surface 242*a*, may reach a front end of the lower reflection region 246. For example, the other F2 of the two focal points F1 and F2 of the ellipse may be positioned at a position corresponding to the lower reflection region 246. More specifically, the front end of the lower reflection region 246 may correspond to the other F2 of the two focal points F1 and F2 of the ellipse and the focal point of the front surface portion 210 based on the upward/downward direction H.

In addition, the lower reflection region 246 may be configured to be involved in forming the first light distribution pattern. That is, the light emitted from the first light source 101 may be reflected by the lower reflection region 246 and then move upward and forward. Thereafter, the light may pass through the front surface portion 210 of the light guide part 200 and finally exit from the light guide part 200, such that the second light distribution pattern may be formed.

For example, a rear surface of the light guide protruding region 244 may include a flat surface region. For example, FIGS. 1 and 2 illustrate states in which the rear surface of the light guide protruding region 244 has an inclined surface shape positioned forward in a downward direction.

Meanwhile, as described above, the first light distribution pattern may be the low beam distribution pattern. That is, the light emitted from the first light source 101 may form the low beam distribution pattern. In this case, as illustrated in FIG. 3, the lower reflection region 246 may have a stepped section 246*a* formed at a boundary between one side surface based on the leftward/rightward direction W and the other side surface based on the leftward/rightward direction W. Based on the boundary of the stepped section 246*a*, one side surface of the lower reflection region 246 based on the leftward/rightward direction W and the other side surface of the lower reflection region 246 based on the leftward/rightward direction W may be different in height in the upward/downward direction H from each other. The above-mentioned stepped section 246*a* may have a shape corresponding to a cut-off line defined at an upper boundary of the low beam distribution pattern.

In addition, the light guide part 200 may further include a light collection region 250 formed between the upper surface portion 230 and the lower surface portion 240 and provided to face the first light source 101. For example, an outer surface of the light collection region 250 may have a curved shape as a whole. More particularly, the light collection region 250 may include a portion having a collimator shape or have a collimator shape.

According to the present disclosure, the light, which is emitted from the first light source 101 and totally reflected by an inner surface of an upper portion of the light collection region 250, may reach the lower reflection region 246, and the light reflected by the lower reflection region 246 may move upward and forward and then exit to the outside through the front surface portion 210 of the light guide part 200. Meanwhile, for example, as illustrated in FIGS. 1 and 2, the light collection region 250 and the downward protruding region 242 may overlap each other in the forward/rearward direction. In this case, it is possible to reduce a length of the light guide part 200 in the forward/rearward direction.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

What is claimed is:

1. A lamp for a vehicle, the lamp comprising:

a light source; and a light guide part disposed at one side of the light source and configured to receive light emitted from the light source, wherein the light guide part comprises:

a front surface portion configured to define a front region of the light guide part;

a rear surface portion configured to define a rear region of the light guide part;

an upper surface portion configured to connect the front surface portion to the rear surface portion and configured to define an upper region of the light guide part; and a lower surface portion configured to connect the front surface portion to the rear surface portion and configured to define a lower region of the light guide part, wherein the light source comprises:

a first light source disposed rearward of the light guide part to face the rear surface portion; and a second light source disposed below the first light source, wherein the lower surface portion comprises a downward protruding region comprising a portion protruding downward, the downward protruding region being at least partially provided rearward of the second light source, wherein the second light source is configured to emit light rearward toward the downward protruding region, and wherein at least a part of the downward protruding region, which faces the second light source, has a light reflection surface.

2. The lamp of claim 1, wherein the light guide part is formed integrally.

3. The lamp of claim 1, wherein the light reflection surface is disposed over an entire front surface of the downward protruding region.

4. The lamp of claim 1, wherein the light reflection surface has a shape recessed rearward.

5. The lamp of claim 1, wherein a cross-section made by cutting the light reflection surface in a direction perpendicular to a leftward/rightward direction W has a shape recessed rearward.

6. The lamp of claim 5, wherein a horizontal cross-section of the light reflection surface has a shape recessed rearward.

7. The lamp of claim 1, wherein a cross-section made by cutting the light reflection surface in a direction perpendicular to a leftward/rightward direction W has a shape of a part of an ellipse recessed rearward.

8. The lamp of claim 7, wherein a light-emitting region of the second light source is provided at a position corresponding to one of two focal points of the ellipse.

9. The lamp of claim 7, wherein the other of two focal points of the ellipse is disposed at a position corresponding to a focal point of the front surface portion based on an upward/downward direction H.

10. The lamp of claim 1, wherein the second light source is disposed such that an optical axis of the second light source has predetermined angles with respect to a forward/rearward direction and an upward/downward direction H.

11. The lamp of claim 1, wherein a height of a light-emitting region of the second light source in an upward/downward direction H corresponds to a height of the light reflection surface in the upward/downward direction H.

12. The lamp of claim 9, wherein the lower surface portion comprises:

a light guide protruding region spaced apart forward from the downward protruding region and protruding downward; and a lower reflection region disposed between the downward protruding region and the light guide protruding region.

13. The lamp of claim 12, wherein a rear surface of the light guide protruding region comprises a flat surface region.

14. The lamp of claim 12, wherein a rear surface of the light guide protruding region comprises an inclined surface shape positioned forward in a downward direction.

15. The lamp of claim 12, wherein the lower reflection region has a stepped section disposed at a boundary between one side surface based on a leftward/rightward direction W and the other side surface based on the leftward/rightward direction W.

16. The lamp of claim 1, wherein the light guide part comprises a light collection region disposed between the upper surface portion and the lower surface portion and disposed to face the first light source.

17. The lamp of claim 16, wherein the light collection region and the downward protruding region overlap each other in a forward/rearward direction.

18. The lamp of claim 16, wherein the light collection region comprises a portion having a collimator shape.

19. The lamp of claim 16, wherein light, which is emitted from the first light source and totally reflected by an inner surface of an upper portion of the light collection region, is configured to reach the lower reflection region.

20. The lamp of claim 12, wherein the other of the two focal points of the ellipse is disposed at a position corresponding to the lower reflection region.

* * * * *